United States Patent Office 3,359,091
Patented Dec. 19, 1967

3,359,091
METHOD OF MAKING A SOIL SUPPLEMENT BY REACTING MINE TAILINGS WITH SULFURIC ACID
Galen W. Clevenger, Prescott, Ariz., assignor to Shattuck Denn Mining Corporation, Humboldt, Ariz., a corporation of Delaware
No Drawing. Continuation of application Ser. No. 197,603, May 25, 1962. This application Dec. 2, 1966, Ser. No. 598,598
1 Claim. (Cl. 71—63)

ABSTRACT OF THE DISCLOSURE

Mine tailings containing substantial amounts of iron sulphides and smaller amounts of zinc sulphide, copper sulphide and manganese sulphide are treated with approximately 25% by weight of concentrated sulphuric acid and then dried. The resulting products are dried and heated at a temperature not less than 200° C. and below the temperature at which sulphur dioxide is evolved for a period of approximately two hours. Thereafter ammonia gas is passed therethrough. The product, in small pellet form, is hardened by the ammonia treatment. The pellets preferably are of a size to pass a 6 mesh screen and be caught upon a 14 mesh screen as distinguished from the original approximately 200 mesh powder of the tailings from which they are formed. The ammonia adds nitrogen to the product to stimulate the uptake of the trace elements by the plant material treated to encourage growth. The acid treatment converts up to 10% of the iron sulphide into iron sulphate which is readily water soluble for immediate use by the vegatation. The remainder of the iron sulphides, probably converted into iron polysulphides, being not readily soluble in water, are slowly converted into iron sulphates by bacterial action and soil moisture after application to provide a slow but continuing source of iron sulphate to the soil.

---

This application is a continuation of my application Ser. No. 197,603, filed May 25, 1962, now abandoned entitled "Soil Supplement and Method of Manufacturing and Using the Same."

This invention relates to a soil supplement or additive and to a method of manufacturing and using the same.

It is well known that at least sixteen elements are considered necessary for the growth of green plants, these being carbon, hydrogen, oxygen, nitrogen, phosphorus, sulfur, potassium, calcium, magnesium, iron, manganese, zinc, copper, molybdenum, boron, and chlorine. See the article entitled "Plant Nutrition and Soil Fertility" by L. A. Dean, appearing at page 80 et. seq. of "Soil," the 1957 yearbook of agriculture, published by the United States Department of Agriculture, 85th Congress, First Session, House Document #30.

Many of these elements exist naturally in adequate quantities in soils or are readily supplied thereto by natural or artificial fertilizers. Some of the elements known as micro-nutrients or trace elements, i.e., iron, manganese, zinc, copper, molybdenum, boron, and chlorine are essential to healthy plant growth although they are not required to be present in large amounts. Probably the most important of these is iron which may be largely absent in Western alkalin and arid soils, or if present, it is not in a condition such that it can be advantageously utilized by plants. When iron is either in an inadequate amount or is largely in a condition such that it is not water soluble or otherwise utilizable by plants, iron chlorosis frequently develops which manifests itself by leaves becoming quite pale and even turning yellow from their natural green. To correct this deficiency in utilizable iron, iron chelates have been developed and distributed. These, while they supply iron in a condition such that it can be utilized by plant growth, have certain objections such as the expense involved in their manufacture and their complete solubility in water. Consequently, when iron chelates are supplied to soils rainfall and irrigation water may quickly leach out the chelates and carry them below or away from the root systems.

Other micro-nutrients besides iron may either be present in deficient quantities in a soil or in conditions such that they cannot be effectively used by plants.

There are many mines which after values are extracted and recovered from their ores, have tailings which are discarded as waste. These tailings contain some of the micro-nutrients largely in the form of metal sulphides and which as such, are not water soluble and are not capable of being used by vegetation.

A primary object of the present invention is to convert these tailings that have heretofore been discarded as waste into a valuable soil additive or supplement wherein the sulphides are at least partially converted into water soluble sulphates. The remaining sulphides of iron, such as pyrites although they are not converted into water soluble sulphates, are altered by the treatment given thereto and converted into other polysulphides that are more susceptible to the action of soil bacteria, and soil moisture to produce soluble sulphates over an extended period of time. It is advantageous to have the sulphides of iron only partially converted into water soluble iron sulphate and the remainder merely altered by the treatment into other polysulphides. Iron sulphate which is water soluble, is readily available to vegetation but in alkaline soils it is apt to be quickly rendered unavailable to vegetation because of its quick precipitation therein as insoluble iron hydroxide. However, it is also known that certain soil bacteria in the presence of soil moisture will in time produce a slow conversion of iron sulphide or iron polysulphides which are relatively insoluble in water into water soluble iron sulphate. Consequently, if the sulphides in the tailings are only partially converted into readily soluble iron sulphate and the remainder remain as polysulphides they are rendered soluble only by the action of soil bacteria and soil moisture, a prolonged action is obtainable. The iron sulphate being water soluble is instantly available to the vegetation upon application and although this may be taken up by the vegetation and also converted by the alkalinity of the soil into insoluble iron hydroxide. The remaining iron polysulphides remain available for a substantial length of time thereafter for slow conversion by soil bacteria and soil moisture into water soluble iron sulphate that can be used by plants even after the initial iron sulphate may have been leached away or converted into iron hydroxide.

A typical illustration of the manner in which the present invention may be employed is that of the Iron King Mine, near Humboldt, Arizona. The analysis of the ore of this mine as mined is of approximately the following analysis:

| | | |
|---|---|---|
| Gold | ounces per ton | .105 |
| Silver | do | .235 |
| Lead | percent | 2.7 |
| Zinc | do | 8.2 |
| Copper | do | .2 |
| Iron | do | 16 |

Balance principally silica and a small amount of aluminum.

This ore is ground 70% to 200 mesh so that it is usable to recover lead and zinc concentrate by froth-flotation. Thereafter, the ore is subjected to froth-flotation, first to recover the lead concentrate and thereafter to recove the zinc concentrate.

The tailings analyze approximately as follows:

| | |
|---|---|
| Gold _____ ounces per ton__ | .03 |
| Silver _____ do____ | .56 |
| Lead _____ percent__ | 1.13 |
| Zinc _____ do____ | 1.3 |
| Copper _____ do____ | .10 |
| Manganese _____ do____ | .04 |
| Iron _____ do____ | 16.4 |

Balance principally silica.

Of these elements zinc, copper, manganese, and iron are among the micro-nutrients beneficial to plant growth but they are present in the tailings principally as sulphides and consequently as such, cannot be beneficially used by vegetation. Consequently, the tailings have heretofore been discarded as waste.

In accordance with the present invention these tailings which although they have been air-dried, contain approximately 10% moisture, are thoroughly mixed and caused to react with one-quarter of their weight of concentrated sulphuric acid, $H_2SO_4$. A small amount of water may be added to the mixture to obtain the correct consistency. During this reaction sulfur dioxide, $SO_2$, and hydrogen sulphide, $H_2S$, are given off. As a result of the reaction up to 10% of the iron sulphides present in the tailings are converted into iron sulphate. Iron sulphate is readily soluble in water and is immediately available for use by vegetation upon application. The remainder of the iron sulphides are in some manner altered and are probably converted into other iron polysulphides. These polysulphides while they are not readily soluble in water, are in such a condition that they can be slowly converted into iron sulphates by the action of soil bacteria and soil moisture. Consequently, these polysulphides form a slow but continuing source of supply of iron sulphate that is supplied to the soil with the passage of time after the iron sulphate has been dissipated or consumed. Oxides present in the tailings are also converted into sulphates of their respective metals by the acid treatment.

After the reaction between the tailings and the sulfuric acid has occurred, the tailings are then dried and heated preferably at a temperature of approximately 200° C. to 350° C. for approximately two hours. The resulting product is then screened to pass through a 6 mesh screen and to be caught on a 14 mesh screen. That portion of the tailings that passes through a 14 mesh screen is recirculated through the mixer with new tailings that are to be treated with the sulfuric acid. The oversized particles are crushed and are thereafter rescreened. The —6+14 mesh granules or pellets are normally those of the desired size. These are transmitted to a hopper through which they are allowed to descend and ammonia gas, $NH_3$, is caused to pass up through them in the course of their descent. The ammonia gas has the effect of hardening the granules or pellets so that they are relatively strong and will not readily break down into the 200 mesh powder of the tailings from which they are formed. In other words, the ammonia gas is admitted to the hopper in a sufficient quantity to harden the resulting product. The ammonia gas also adds nitrogen which apparently becomes chemically combined with some of the micro-nutrients present in the tailings. Some of the ammonia may be present in the resulting product as ammonium sulphate. It also may be present in the form of soluble complexes of ammonia and of the various metals present in the tailings. This nitrogen is of value when present in a intimate mixture with the micronutrient or trace elements as it provides a growth stimulant at the time the trace element is added to the soil, thus stimulating the uptake of the trace elements by plants.

The finished product analyzes approximately as follows:

| | Percent |
|---|---|
| Iron _____ | 12.5 |
| Zinc _____ | 1.2 |
| Copper _____ | .10 |
| Manganese _____ | .04 |
| Sulfur _____ | 17 |
| Nitrogen _____ | 2 |

Balance, principally silica.

This material remains slightly acid despite the fact that it has been treated with ammonia. It is possible that in the treatment ferrous ammonium sulphate might be produced. The amount of ammonia that is added or supplied to the hopper through the granules or pellets descending therethrough is determined by the height of the exothermic reaction that occurs in the hopper. In other words, the ammonia is discharged into the hopper at such a rate that it does not issue through the top of the descending granules as free ammonia.

In use, the pellets or granules are distributed or spread over the soil as a soil additive at the rate of from 200–800 lbs. per acre. Laboratory analyses have shown that plants or vegetation so treated with the product took up or acquired more iron than similar plants which did not have it.

In lieu of screening the particles after they have been treated by the acid and dried, the mixture can be placed in a pelletizing apparatus of any preferred type to produce pellets of approximately the same size. The use of such a pelletizing apparatus can eliminate the operations of screening and re-crushing.

It is not necessary to subject the tailings to both the acid treatment and the heat treatment. Either treatment can be used alone. In other words, treatment of the tailings merely by the mixture therewith of the concentrated sulfuric acid without heat thereafter will produce a partial conversion of the tailings into water soluble iron sulphates and into iron polysulphide. Furthermore, it is possible to eliminate the use of acid entirely and to subject tailings merely to a heat treatment. If the acid treatment is eliminated and the heat treatment alone is relied upon, the tailings are preferably heated to a temperature of between 300 and 400°, preferably in the neighborhood of 350° C. or to a temperature just below that required for sulfur dioxide, $SO_2$, evolution. The heat treatment alone will cause a partial conversion of iron sulphides into iron sulphate and the formation of iron polysulphides. While either the acid treatment or the heat treatment alone can be used, both are preferably used together as both seem to contribute to the formation of iron sulphate and of the polysulphides.

The ammonia complexes and the sulphates present in the resulting product are immediately available for use by plant growth so that if vegetation is suffering from iron chlorosis an immediate response is observable following application. However, as above noted, not all of the sulphides present in the tailings are converted into the water soluble sulphates. The remaining iron polysulphides resulting from the treatment are in fine granular form and are available to be acted upon by soil bacteria and soil moisture and are slowly converted from sulphides into sulphates. Consequently, the soil supplement may be regarded as having a prolonged and partially delayed action in that there is a prolonged and slow conversion of the insoluble sulphides into soluble sulphates.

It is known that coal or other carbonaceous material is apparently a catalyst that promotes the oxidation of iron pyrites, see Journal of Industrial and Engineering Chemistry, vol. 18, page 1303, 1926. Therefore, the present invention contemplates the addition of coal particles or other carbonaceous particles either to the finished product or to the product in the course of its manufacture to promote the oxidation of the sulphides after the supplement has been distributed.

While the tailings may not contain all of the micronutrient elements, they do contain those which are highly important to plant growth and it is within the scope of the invention to dress the product when necessary or desired by the addition of other compounds containing the micro-nutrients that are not present in the tailings.

From the foregoing it will be appreciated that a material heretofore regarded as unusable and as waste can be readily converted into a valuable and marketable soil additive or supplement. The invention is not restricted in its application to the tailings of the Iron King Mine in Arizona, but may be used wherever the tailings from a mining operation have comparable analyses containing valuable micro-nutrients.

Various changes may be made in the details of the method without departing from the spirit and scope of the invention.

I claim:

The method of producing a soil supplement which comprises treating a given weight of air-dried mine tailings containing substantial amounts of iron sulphides and smaller amounts of zinc sulphide, copper sulphide and manganese sulphide with concentrated sulfuric acid in an amount approximately one quarter of the weight of the tailings, drying and heating the resulting product to a temperature of not less than 200° C. and below that at which $SO_2$ is evolved for about two hours, and thereafter passing ammonia gas therethrough in an amount sufficient to harden the resulting product.

References Cited

UNITED STATES PATENTS

| Re. 21,638 | 11/1940 | Treeland | 71—64 |
| 2,741,876 | 4/1956 | Paoloni | 71—63 |
| 2,927,851 | 3/1960 | Wilson | 71—62 |

FOREIGN PATENTS

| 538,347 | 7/1941 | Great Britain. |

OTHER REFERENCES

Jacobson Encyclopedia of Chemical Reactions, Reinhold, N.Y. 1951, vol. IV, page 71. QD 73J3.

DONALL H. SYLVESTER, *Primary Examiner.*

R. BAJEFSKY, *Assistant Examiner.*